US008352537B2

(12) United States Patent
Virdee

(10) Patent No.: US 8,352,537 B2
(45) Date of Patent: Jan. 8, 2013

(54) OBJECT MODELING SCHEME FOR NEXT GENERATION NETWORK WAVELENGTH DIVISION MULTIPLEXING

(75) Inventor: Harbhajan Singh Virdee, Allen, TX (US)

(73) Assignee: Futurewei Technologies, Inc., Plano, TX (US)

( * ) Notice: Subject to any disclaimer, the term of this patent is extended or adjusted under 35 U.S.C. 154(b) by 248 days.

(21) Appl. No.: 12/555,416

(22) Filed: Sep. 8, 2009

(65) Prior Publication Data
US 2010/0061728 A1 Mar. 11, 2010

Related U.S. Application Data

(60) Provisional application No. 61/095,212, filed on Sep. 8, 2008.

(51) Int. Cl.
*H04J 14/02* (2006.01)
(52) U.S. Cl. ......... 709/200; 709/250; 370/254; 370/410
(58) Field of Classification Search .................. 709/200, 709/258; 370/248, 254, 410
See application file for complete search history.

(56) References Cited

U.S. PATENT DOCUMENTS

| | | | | |
|---|---|---|---|---|
| 5,592,628 | A * | 1/1997 | Ueno et al. ..................... | 709/200 |
| 6,714,518 | B1 * | 3/2004 | Weis ............... | 370/248 |
| 6,757,745 | B1 * | 6/2004 | Hamann et al. ............... | 709/250 |
| 7,185,075 | B1 | 2/2007 | Mishra et al. | |
| 7,890,483 | B1 * | 2/2011 | Aaron et al. ................... | 707/705 |
| 2002/0129166 | A1 | 9/2002 | Baxter et al. | |
| 2003/0133494 | A1 * | 7/2003 | Bender et al. ................. | 375/130 |
| 2004/0006619 | A1 | 1/2004 | Syed et al. | |
| 2005/0076386 | A1 * | 4/2005 | Carter et al. ................... | 725/111 |
| 2005/0119863 | A1 * | 6/2005 | Buikema et al. ............... | 702/188 |
| 2006/0211294 | A1 * | 9/2006 | Lipski et al. ................... | 439/488 |
| 2007/0203900 | A1 * | 8/2007 | Lu ..................... | 707/4 |
| 2007/0286086 | A1 * | 12/2007 | Taylor et al. ................... | 370/241 |
| 2008/0025332 | A1 * | 1/2008 | Wang et al. ................... | 370/410 |
| 2008/0174953 | A1 * | 7/2008 | Fuke et al. ..................... | 361/687 |
| 2008/0288821 | A1 * | 11/2008 | Aaron ............................. | 714/26 |
| 2010/0223782 | A1 * | 9/2010 | Maenishi ........................ | 29/739 |
| 2010/0287079 | A1 * | 11/2010 | Cai et al. ........................ | 705/34 |

OTHER PUBLICATIONS

Foreign Communication From a Related Counterpart Application—International Preliminary Report on Patentability, PCT/US2009/056250, Dec. 27, 2010, 20 pages.
Foreign communication from a counterpart application, PCT application PCT/US/2009/056250; International Search Report, dated Mar. 18, 2010, 6 pages.

(Continued)

*Primary Examiner* — Tesfay Yohannes
(74) *Attorney, Agent, or Firm* — Conley Rose, P.C.; Grant Rodolph; Stephen R. Loe

(57) ABSTRACT

An apparatus comprising a plurality of entities associated with a network element (NE), wherein the entities are associated with each other in a hierarchical architecture, wherein each entity is assigned an Access Identifiers (AID), and wherein each AID comprises a prefix that indicates a type for the corresponding entity and a numerical field that indicates the association between the corresponding entities and the remaining entities. Also disclosed is an apparatus comprising at least one processor configured to implement a method comprising assigning an AID to each of a plurality of NE entities having a hierarchical relationship, wherein the AID comprises a prefix comprising no more than about five characters and a numerical string consisting essentially of numbers, and managing the NE entities using the AIDs.

18 Claims, 10 Drawing Sheets

OTHER PUBLICATIONS

Foreign communication from a counterpart application, PCT application PCT/US/2009/056250; Written Opinion, dated Mar. 18, 2010, 9 pages.

Bellcore, "Operations Application Messages—Language for Operations Application Messages (A Module of OTGR, FR-439)," GR-831-CORE, OTGR Section 12.1, Issue 1, Nov. 1996.

* cited by examiner

OBJECT MODELING SCHEME FOR NEXT GENERATION NETWORK WAVELENGTH DIVISION MULTIPLEXING

CROSS-REFERENCE TO RELATED APPLICATIONS

This application claims priority to U.S. Provisional Application No. 61/095,212, filed Sep. 8, 2008 by Harbhajan Singh Virdee, and entitled "Object Modeling Scheme for Next Generation Network Wavelength Division Multiplexing," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some networks, such as optical and broadband access networks, various network element (NE) objects are provisioned, monitored, and/or cross-connected using management protocols, such as Transaction Language 1 (TL1). Accordingly, management protocol messages, such as TL1 commands, are passed between the NEs and the network management system. The messages comprise management commands and/or functions for configuring objects or entities associated with the NEs, such as cards, ports, connections, etc. The commands comprise Access Identifiers (AIDs) that are used to specify the NE objects or entities, for example for provisioning purposes. Typically, the time needed for parsing AIDs for provisioning, monitoring, and/or cross-connecting the NEs can be affected by the length of AIDs. Configuring new objects or entities, such as for new provider equipment or network components, using new AID formats should meet a qualification process for Operations Systems Modification of Intelligent Network Elements (OSMINE). The OSMINE qualification process is developed and standardized by Telcordia Technologies to ensure compatibility with various operating systems.

SUMMARY

In a first embodiment, the disclosure includes an apparatus comprising a plurality of entities associated with a NE, wherein the entities are associated with each other in a hierarchical architecture, wherein each entity is assigned an AID, and wherein each AID comprises a prefix that indicates a type for the corresponding entity and a numerical field that indicates the association between the corresponding entities and the remaining entities.

In a second embodiment, the disclosure includes an apparatus comprising at least one processor configured to implement a method comprising assigning an AID to each of a plurality of NE entities having a hierarchical relationship, wherein the AID comprises a prefix comprising no more than about five characters and a numerical string consisting essentially of numbers, and managing the NE entities using the AIDs.

In a third embodiment, the disclosure includes a method comprising assigning a prefix to each of a plurality of entities associated with a NE, wherein the prefixes consist essentially of no more than about five letters and at least some of the prefixes consist essentially of two letters, assigning a plurality of numerical fields to the entities, wherein the numerical fields are substantially free of letters, and associating the prefixes with the numerical fields that correspond to the same entities to obtain a plurality of AIDs.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method of using an improved AID model to manage the NEs in a network, such as for provisioning, monitoring, and/or cross-connecting purposes. Specifically, each NE associated object or entity is assigned an AID, which may comprise a prefix and a field. The prefix may be a relatively short string of characters, which may specify the type of the associated entity, e.g., shelf, slot, port, facility, etc. The field may be a string of numbers without any characters, which may be added to the prefix to enumerate one of a plurality of entities that correspond to the same prefix and type. The field may also specify the hierarchical relationship between the corresponding entity and any other associated entity. The AID model may simplify the identification of the different associated entities, the determination of their types, and the determination of their hierarchical relationships. The AID model may provide a simpler user interface for managing the NEs, reduce the length of AIDs and hence parsing time, and/or reduce cost for OSMINE qualification.

Figure 1:
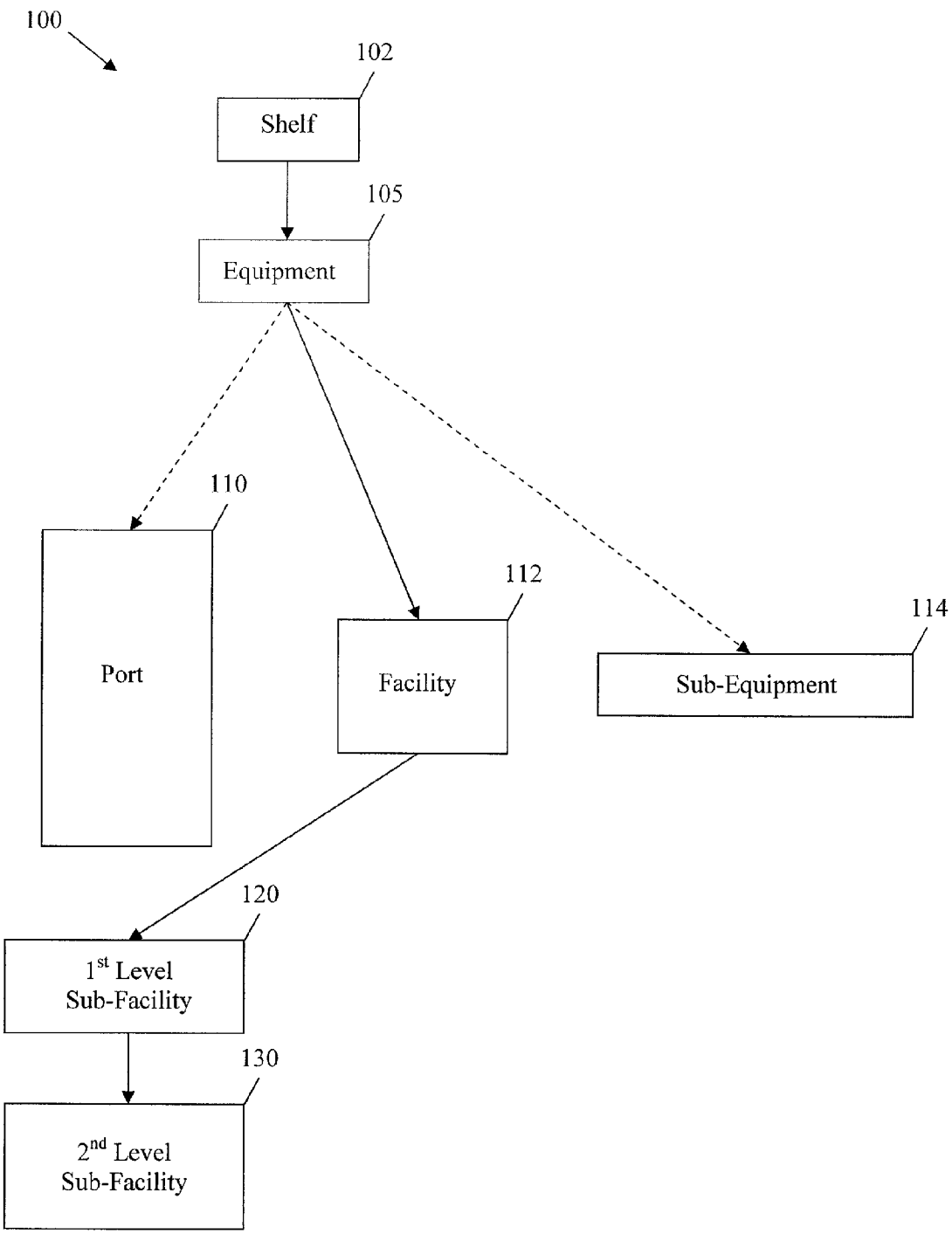
FIG. 1 is a schematic of an embodiment of an AID hierarchy model.

FIG. 1 illustrates one embodiment of AID hierarchy model 100, which may correspond to a plurality of entities or objects associated with a NE. The NE may be any component, device, or server used to send, receive, and/or forward data in a network. For example, the NE may comprise a rack, a server, a router, a switch, any other network equipment, or combinations thereof. The NE associated entities may be coupled to one another in a hierarchical relationship. For example, the connections between the different entities may branch-out in a free-like architecture or other hierarchical architecture. Based on the AID hierarchy model 100, the NE entities may be provisioned using a plurality of AIDs that may reflect the hierarchy of the NE entities. Specifically, the AID hierarchy model 100 may comprise a shelf 102, for instance at the top of the hierarchy, and at least one equipment 105 associated with the shelf 102. Additionally, the NE entities may comprise at least one port 110 and at least one corresponding facility 112 that may be associated with the equipment 105. Additionally or alternatively, the NE entities may also comprise at least one sub-equipment 114 associated with the equipment 105. In some embodiments, the AID hierarchy model may also comprise a first level sub-facility 120 associate with the facility 112 and optionally a second level sub-facility 130 associated with the first level sub-facility 120.

The shelf 102 may be any device associated with a NE. For example, the shelf 102 may be one of a plurality of shelves 102 in a server or switch rack. In an embodiment, the shelf 102 may comprise a plurality of hardware components. In this case, each shelf 102 may be associated with the NE entities using the AID hierarchy model 100. The shelf 102 may be assigned an AID, which may indicate that the corresponding object is a shelf entity or type. Additionally, the AID may distinguish the shelf 102 from any other shelves 102, for example on the same rack. In an embodiment, the AID for the main shelf may be assigned an AID of about one.

The equipment 105 may be any device or component associated with or configured to couple to the shelf 102. For instance, the equipment 105 may be a hardware component, such as a transmitter and/or receiver (transceiver), a multiplexer and/or demultiplexer (MUX/DEMUX), a switch, a router, a connector, and/or other network equipment. In an embodiment, the shelf 102 may comprise a plurality of equipment 105. Each equipment 105 may be assigned an AID, which may indicate that the corresponding object is an equipment entity or type. The AID for each equipment 105 may also distinguish it from any other equipment 105 on the same shelf 102.

The port 110 may be any port associated with or coupled to the equipment 105. Specifically, the port 110 may be a physical or a logical port 110 associated with the equipment 105. For instance, the port 110 may correspond to an ingress or egress port 110 that may be coupled to the equipment. In an embodiment, a plurality of ports 110 may be connected to the same equipment 105. As such, each port 110 may be assigned an AID, which may indicate that the corresponding object is a port entity or type. The AID for each port 110 may also distinguish it from any other ports 110 coupled to the same equipment 105.

The facility 112 may be any link or connection that may be associated with the port 110 and/or equipment 105. The facility 112 may also correspond to an individual port 110 associated with the equipment 105. For example, the facility 112 may indicate any connection between to the corresponding equipment 105 via the corresponding port 110. Because facilities 112 are coupled to ports 110, the ports 110 and the facilities 112 may have the same AID numerical string. The facility 112 may correspond to a Wavelength Division Multiplexing (WDM) link, Time Division Multiplexing (TDM) link, or Ethernet link with the equipment 105. For example, the facilities 112 may comprise SONET carrier (OCxx), Gigabit Ethernet (GETH), optical channel (OCH), optical transport unit (OTUx), multirate optical signal (OCN), or combinations thereof, where x is an integer. In an embodiment, a plurality of facilities may be coupled with the same equipment 105, via a plurality of corresponding ports 110. As such, each facility may be assigned an AID, which may indicate that corresponding object is a facility entity or type. The AID for each facility 112 may also distinguish it from any other facilities 112 associated with the same equipment.

The sub-equipment 114 may be any sub-component that may be associated with the equipment 105. For instance, the sub-equipment 114 may correspond to Small Form-Factor Pluggable (SFP) component coupled to the corresponding equipment 105. In an embodiment, a plurality of sub-equipment 114, e.g., SFPs, may be connected to the same equipment 105. As such, each sub-equipment 114 may be assigned an AID, which may indicate that the corresponding object is a sub-equipment entity or type. The AID for each sub-equipment may also distinguish it from any other sub-equipment 114 coupled to the same equipment.

The first level sub-facility 120 and second level sub-facility 130 may correspond to any first level and second level sub-links, respectively, that may be associated with the facility 112. For instance, the facility 112 may correspond to optical data unit (ODU2), the first level sub-facility 120 may correspond to ODU1, and the second level sub-facility 130 may correspond to OC3. For example, the first level sub-facility 120 and/or the second level sub-facility 130 may correspond to a Wavelength Division Multiplexing (WDM) sub-link, Time Division Multiplexing (TDM) sub-link, Ethernet sub-link, or other type of sub-link with the equipment 105. A plurality of first level sub-facilities 120 and optionally second level sub-facilities 130 may be established via the same main facility 112 with the equipment 105. As such, each first level sub-facility 120 and second level sub-facility 130 may be assigned an AID, which may indicate that corresponding object is a first level sub-facility 120 or second level sub-facility 130 entity. The AID for each first level sub-facility 120 and second level sub-facility 130 may also distinguish it from any other sub-facilities.

Figure 2:
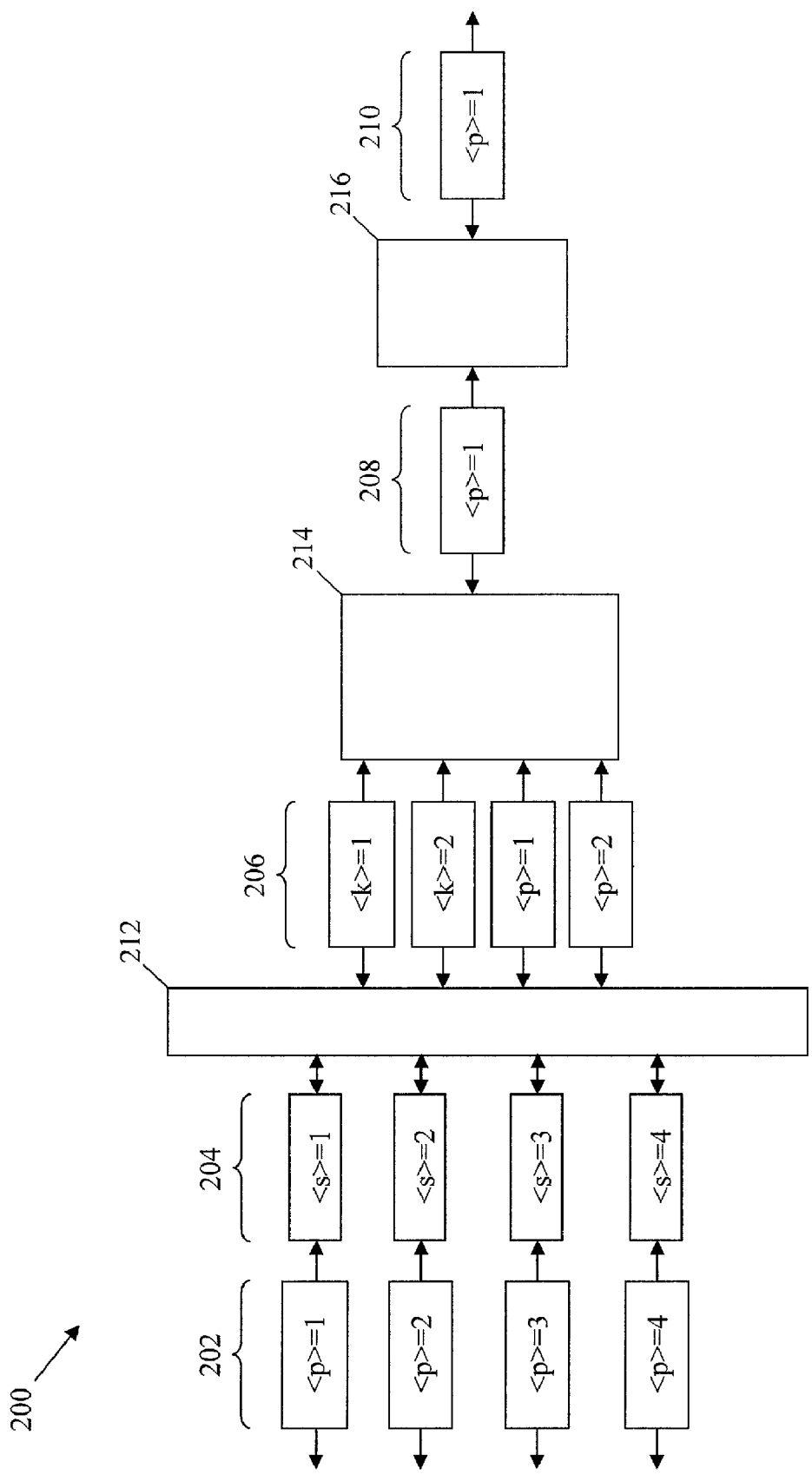
FIG. 2 is a schematic diagram of an embodiment of a connected entities model.

FIG. 2 illustrates one embodiment of a connected entities model 200. For instance, the network entities may be interconnected on a shelf or rack, such as for a modem or network driver. The entities may also be associated or connected with one another in a hierarchy, for instance according to the AID hierarchy model 100. The entities may comprise a plurality of first end ports 202 and corresponding sub-equipment 204, a plurality of intermediate ports/sub-facilities 206, an aggregate port 208, and a second end port 210. Additionally, the entities may comprise a first network component 212 positioned between the sub-equipment 204 and the intermediate ports/sub-facilities 206, a second network component 214 positioned between the intermediate ports/sub-facilities 206 and the aggregate port 208, and a third component 216 positioned between the aggregate port 208 and the second end port 210. Although FIG. 1 shows four first end ports 202, a corresponding sub-equipment 204, four intermediate ports/sub-facilities 206, and three network components 212, 214, and 216, the entities may comprise any quantity of first end ports 202, sub-equipment 204, intermediate ports/sub-facilities 206, and network components. The entities may also comprise any quantity of aggregate ports 208 and second end ports 210. Further, the quantity of first end ports 202 and corresponding sub-equipment 204 may be equal to or different than the intermediate ports/sub-facilities 206.

The first network component 212 may be any hardware component configured to receive data from the first end ports 202 via the corresponding sub-equipment 204, combine or rearrange the data, and forward the data via the intermediate ports/sub-facilities 206. Similarly, the first network component 212 may forward data from the intermediate ports/sub-facilities 206 to the first end ports 202 via the corresponding sub-equipment 204. The second network component 214 may be any hardware component configured to receive data from the intermediate ports/sub-facilities 206, combine the data, and forward the data via the aggregate port 208. Similarly, the second network component 214 may forward data from the aggregate port 208 to the intermediate ports/sub-facilities 206. The third network component 216 may be any hardware component configured to receive a first type of data signals (e.g., electrical signals) from the aggregate port 208, convert the first data signals into second data signals (e.g., optical signals), and forward the second data signals via the second end port 210. Similarly, the third component 216 may convert and forward data signals from the second end port 210 to the aggregate port 208. In a specific embodiment, the entities above may be components in a WDM network, such as a coarse WDM (CWDM) or dense WDM (DWDM) network, a Synchronous Optical Networking (SONET) network, a Synchronous Digital Hierarchy (SDH) network, or any other optical transport network. Accordingly, the first network component may be a port switch or a cross-connect (XCON), the second network component may be and ODU and/or Optical Transport Unit (OTU), and the third network component may be an optical transmitter and/or receiver module.

In the connected entities model 200, each entity may be assigned a unique AID comprising a prefix and at least one field. The prefixes may designate the types of the corresponding entities and may comprise strings of characters that may be relatively shorter than the fields. The fields may indicate the individual entities and their hierarchical relationship or association with other entities, and may comprise strings of numbers or digits without any characters. As such, different entities may share the same prefix but have different fields.

Table 1 shows an embodiment of an AID table that may be used to associate the AIDs with a plurality of connected entities, e.g., in the connected entities model 200. The entities may correspond to a plurality of types, including a shelf, equipment, sub-equipment, port, facility, first level sub-facility, and/or second level-sub-facility. The AIDs assigned to each entity may comprise a prefix, which may have a maximum size of about five letters, and at least one field, which may be one or a series of integers that enumerates the corresponding entity. For instance, the entities may be associated with a shelf that may be assigned the prefix "SHELF" to indicate a shelf type entity. Additionally, in the case of a plurality of shelves, each shelf's AID may comprise a different first field to distinguish the individual shelves from each other. For instance, each shelf may be assigned a first field equal to any integer from one to m, where m is equal to the quantity of shelves. For a master shelf, m may be equal to about one.

A number of features will be apparent in the connected entities model 200. For example, specific prefixes may be allowed for programmable entities. The actual provisioning of the entity may determine the exact type of entity. This feature may be important as future equipment is multi-purpose and internal switching/selection of multiple types of entities can be accessed at the same port. In addition, the objects/entities may be made consistent for all modules in the model for easy user understanding and provisioning. Such helps in the reduction of errors in provisioning. It will also be appreciated that this scheme provides user-friendly access to all points within the modules for alarms and performance monitoring, and also may provide an improved understanding as to what kind of alarms and Performance Monitoring (PM) can be expected on the types of objects/entities being accessed. Furthermore, this scheme simplifies the cross-connect provisioning from client to communication channels (end-to-end within the NE) and allows for "smart" software solutions to find the best path (from the multiple options available within the NE) to cross-connect the services. The combination of <MOD2> (of the TL1 command code) and prefix (of the AID) determines the exact type of object and also keeps the number of fields in the AID to a minimum, e.g., for a main facility or port or sub-equipment entities, the maximum of about three fields may be required in the AID. The TL1 command code is described in the Telcordia Standard GR-831-CORE and is of the form:

<command code>=<VERB>-<MOD1>-<MOD2>.

Moreover, the current scheme uses a prefix that may be about two letters in length. Finally, multiple types of cross-connect are possible through the backplane with this scheme, allowing different facilities to be groomed from different plug-in units (PIUs). Such may allow for a large messed cross-connectivity to be achieved without the need for a central cross-connect unit.

TABLE 1

| Object/Entity Type | Prefix | AID | | | | |
|---|---|---|---|---|---|---|
| | | $1^{st}$ Field | $2^{nd}$ Field | $3^{rd}$ Field | $4^{th}$ Field | $5^{th}$ Field |
| Shelf | SHELF | m | | | | |
| Equipment | SLOT | m | n | | | |
| Sub-Equipment | SUB-SLOT | m | n | s | | |
| Port | PC | m | n | p | | |
| | PN | | | | | |
| | LC | | | | | |
| | LN | | | | | |
| | LA | | | | | |
| | PP | | | | | |
| Facility | PC | m | n | p | | |
| | PN | | | | | |
| | LC | | | | | |
| | LN | | | | | |
| | LA | | | | | |
| | PP | | | | | |
| $1^{st}$ Level Sub-Facility | LC | m | n | p | k | |
| $2^{nd}$ Level Sub-Facility | LC | m | n | p | k | l |

A plurality of equipment may be associated with each shelf. The AID prefix assigned to each of the equipment may be "SLOT," which may indicate an equipment type entity. To specify the hierarchical relationship between the equipment and the corresponding shelves, each equipment's AID may also comprise a first field that is equal to the corresponding shelf's first field. Additionally, the AID for each of the equipment associated with the same shelf may comprise a different second field, which may distinguish the corresponding equipment from any other equipment. For instance, each of the equipment associated with the same m-th shelf may be assigned a first field equal to m and a second field equal to any integer from one to n, where n is equal to the quantity of equipment associated with the m-th shelf. For example, the first network component 212, the second network component

214, and the third network component 216 may be equipment associated with same shelf. As such, the first field for each of the first network component 212, the second network component 214, and the third network component 216 may be equal to about one. However, the second field may be equal to about one for the first network equipment 212, about two for the second network equipment 214, and about three for the third network equipment 216.

A plurality of sub-equipment may be associated with any of the equipment. The AID prefix assigned to each of the sub-equipment may also be "SLOT," which may indicate an equipment related type entity. To specify the hierarchical relationship between the sub-equipment and the corresponding equipment and shelves, each sub-equipment's AID may also comprise a first field that is equal to the corresponding shelf's first field and a second field that is equal to the corresponding equipment's second field. Additionally, the sub-equipments' AIDs may comprise different third fields, which may distinguish the individual sub-equipment from each other. For instance, each sub-equipment from a plurality of sub-equipment associated with the same m-th shelf and n-th equipment may be assigned a first field equal to m, a second field equal n, and a third field equal to any integer from one to s, where s is equal to the quantity of sub-equipment. For example, the sub-equipment 204 may be associated with the first network component 212. As such, the first field for each of the sub-equipment 204 may be equal to about one, and the second field may be equal to about one. For the individual sub-equipment 204, the third fields may be equal to about one, about two, about three, and about four as appropriate.

A plurality of ports may be associated with each equipment and shelf. The AID prefix assigned to each port may be one of a plurality of character strings, which may indicate a port type entity. For instance, the AID prefix assigned to the port may be "PC" that indicates a physical client port, "PN" that indicates a physical network port, "LC" that indicates a logical client port, "LA" that indicates a logical access port, "LN" that indicates a logical network port, or "PP" that indicates a provisional port. To specify the hierarchical relationship between the ports and the corresponding equipment and shelves, each port's AID may also comprise a first field that is equal to the corresponding shelf's first field and a second field that is equal to the corresponding equipment's second field. Additionally, the ports' AIDs may comprise different third fields, which may distinguish the individual ports from each other. For instance, each port from a plurality of ports associated with the same m-th shelf and n-th equipment may be assigned a first field equal to m, a second field equal n, and a third field equal to any integer from one to p, where p is equal to the quantity of ports.

For example, the first end ports 202 may be associated with the first network component 212, the intermediate ports/sub-facilities 206 may be associated with the first network component 212 or the second network component 214. Similarly, the aggregate port and/or the aggregate port 208 may be associated with the second network component 214 or the third network component 216, and the second end port 210 may be associated with the third network component 216. As such, the first field for each of the first end ports 202, the intermediate ports/sub-facilities 206, the aggregate port 208, and the second end port 210 may be equal to about one. The second field may be equal to about one for each of the first end ports 202, to about one or two for each of the intermediate ports/sub-facilities 206, to about two or three for the aggregate port 208, and to about three for the second end port 210. The first end ports 202 and the intermediate ports/sub-facilities 206 may be assigned different prefixes, for example if different ports are assigned the same second field, e.g., about one. Similarly, the intermediate ports/sub-facilities 206, the aggregate port 208, and/or the second end port 210 may be assigned different prefixes. For the individual first end ports 202 and similarly the individual intermediate ports/sub-facilities 206, the third fields may be equal to about one, about two, about three, and about four. Both the aggregate port 208 and the second end port 210 may also be assigned a third field equal to about one.

Similarly, a plurality of facilities may be associated with each equipment and shelf. The AID prefix assigned to each facility may be one of a plurality of character strings, which may indicate the port type associated with the facility. For instance, the AID prefix assigned to the facility may be "PC," "PN," "LC," "LA," "LN," or "PP" according to the type of the associated port. Further, to specify the hierarchical relationship between the facilities and the corresponding equipment and shelves, each facility's AID may also comprise a first field that is equal to the corresponding shelf's first field and a second field that is equal to the corresponding equipment's second field. The facilities' AIDs may comprise different third fields, which may distinguish the individual facilities from each other. The third fields may also be equal to the associated ports' third fields. For instance, each facility from a plurality of facilities associated with the same m-th shelf, the same n-th equipment, and a corresponding associated p-th port may be assigned a first field equal to m, a second field equal n, and a third field equal to p.

A plurality of first level sub-facilities and second level sub-facilities may be associated with each facility, e.g., any of the intermediate ports/sub-facilities 206. The AID prefix assigned to each of the first level and second level sub-facilities may be "LC," which may indicate a sub-facility type entity for a logical client. To specify the hierarchical relationship between the first level and second level sub-facilities and the remaining associated entities, the AID for each first level and second level sub-facility may also comprise a first field that is equal to the corresponding shelf's first field, a second field that is equal to the corresponding equipment's second field, and a third field that is equal to the corresponding facility's third field and port's third field. Additionally, the first level sub-facilities' AIDs may comprise different fourth fields, which may distinguish the individual first level sub-facilities from each other. To specify the hierarchical relationship between the first level sub-facilities and the second level sub-facilities, the AID for each second level sub-facility may also comprise a fourth field that is equal to the corresponding first level sub-facility's fourth field. The second level sub-facilities' AIDs may comprise different fifth fields, which may distinguish the individual second level sub-facilities from each other.

For instance, each first level and second level sub-facility from a plurality of sub-facilities associated with the same m-th shelf, n-th equipment, and p-th facility may be assigned a first field equal to m, a second field equal n, and a third field equal to p. Each first level sub-facility may also be assigned a fourth field equal to any integer from one to k, where k is equal to the quantity of first level sub-facilities for the same facility p. Each second level sub-facility associated with the k-th first level sub-facility may be assigned a fourth field equal to k and a fifth field equal to any integer from one to l, where l is equal to the quantity of second level sub-facilities for the same first level sub-facility k.

As shown in Table 1, the prefixes in the AIDs assigned to the different entities may comprise a limited size string of characters, e.g., less than or equal to about five characters. The prefixes may then be followed by a field or fields comprising a limited size string of digits or integers. Such relatively short AID length, e.g., in comparison to previously used AID formats, may reduce the time needed to parse the AIDs. For instance, the AIDs may be combined with <MOD2> in TL1 commands to improve provisioning, monitoring, and/or cross-connecting the different entities and NEs. In a preferred embodiment, the prefixes may not comprise any digits and the fields may not comprise any characters, which may simplify the process of parsing the AIDs and provide a simpler user interface for managing the NEs. Additionally, the AID provisioning model in FIG. 2 may be standardized for a plurality of different NEs, entities, and/or networks to reduce the cost of developing network equipment that meet the OSMINE qualification process.

Figure 3:
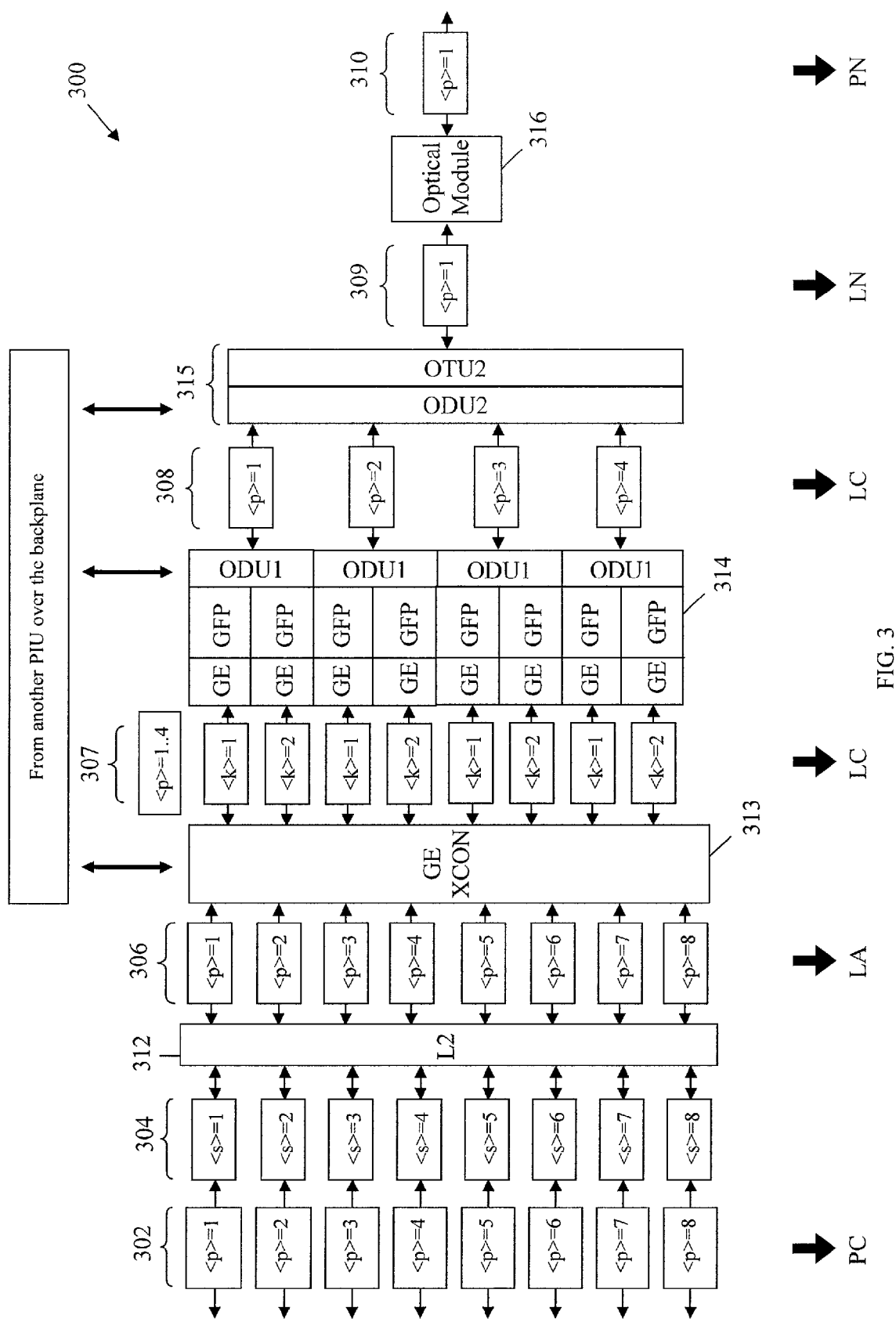
FIG. 3 is a schematic diagram of another embodiment of the connected entities model.

FIG. 3 illustrates another embodiment of a connected entities model 300, for example in a PIU-1 on a shelf. The entities may comprise a plurality of first end ports 302 and corresponding SFPs 304, a plurality of intermediate ports 306 and sub-facilities 307, a plurality of first aggregate ports 308, a second aggregate port 309, and a second end port 310. Additionally, the entities may comprise a Layer Two (L2) switch 312 positioned between the SFPs 304 and the intermediate ports 306, and a Gigabit Ethernet (GE) XCON 313 positioned between the intermediate ports 306 and the sub-facilities 307. The entities may also comprise a first ODU 314 positioned between the sub-facilities 307 and the first aggregate ports 308, a second ODU 315 positioned between the first aggregate ports 308 and the second aggregate port 309, and an optical module 316 positioned between the second aggregate port 309 and the second end port 310.

The L2 switch 312 may forward data the between the first end ports 302, via the SFPs 304, and the intermediate ports 306. Specifically, the L2 switch 312 may switch between the first end ports 302 and the intermediate ports 306 to route the data properly. Similarly, the GE XCON 313 may forward data between the intermediate ports 306 and the sub-facilities 307. The data corresponding to the sub-facilities 307 may be transmitted and/or received via a plurality of ports between the GE XCON 313 and the first ODU 314. For instance, about four ports may be connected between the GE XCON 313 and the first ODU 314, where each port may support about two sub-facilities 307. The first ODU 314 may comprise a plurality of GE Generic Framing Protocol (GFP) ODU1 modules, which may combine data frames from the sub-facilities 307 and forward the combined data to the first aggregate ports 308. For instance, each GE GFP ODU1 may forward the combined data from about two sub-facilities 307 to one corresponding first aggregate port 308. Similarly, the first ODU 314 may also reframe data from the first aggregate ports 308 and forward the frames via the appropriate sub-facilities 307. The second ODU 315 may comprise an ODU2/OTU2 converter, which may reframe and forward data between the first aggregate ports 308 and the second aggregate port 309. The optical module 316 may receive electrical data signals from the second aggregate port 309, convert the data signals into optical data signals, and forward the optical data signals via the second end port 310. Similarly, the optical module 316 may receive optical data signals from the second end port 310 and forward electrical data signals to the second aggregate port 309.

Table 2 shows an embodiment of an AID table that may be used to associate the AIDs with the entities in the connected entities model 300. In the Table 2, the integers represented by m, n, s, p, and k may be used to enumerate the different entities. Accordingly, m may indicate a shelf identity (ID) number, n may indicate a slot or equipment number, s may indicate a sub-slot or sub-equipment number, p may indicate a port or facility number, and k may indicate a facility of sub-facility number. The prefixes assigned to the ports/facilities in the PIU may comprise the prefix "PC" that corresponds to the first end ports 302 and indicates physical client ports, "LA" that corresponds to the intermediate ports 306 and indicates logical access ports, and "LC" that corresponds to the sub-facilities 307 and first aggregate ports 308 and indicates logical client ports. Additionally, the prefixes may comprise "LN" that corresponds to the second aggregate port 309 and indicates a logical network port, and "PN" that corresponds to the second end port 310 and indicates a physical network port. There may be about eight first end ports 302, and similarly about eight intermediate ports 306, which may be assigned the integer p from about one to about eight. There may be about four ports supporting the sub-facilities 307, where each one of the ports may be assigned the integer p from about one to about four. The second aggregate port 309, and similarly the second end port 310, may be assigned an integer p equal to about one.

TABLE 2

| Prefix | Port/Facility Description | PIU-1 Specific |
|---|---|---|
| PC | Physical Client Port | p = 1 . . . 8 |
| LA | Logical Access Port | p = 1 . . . 8 |
| LC | Logical Client Port | p = 1 . . . 4, k = 1 . . . 2 |
| LC | Logical Client Port | p = 1 . . . 4 |
| LN | Logical Network Port | p = 1 |
| PN | Physical Network Port | p = 1 |

| Equipment AIDs | Generic Equipment AID: SHELF/SLOT -<shelfID#>[-<slot#>[-<sub-slot#>]] | | |
|---|---|---|---|
| MOD2 | AID | Equipment Type | PIU-1 Specific |
| EQPT | SHELF-<m> | Shelf | |
| EQPT | SLOT-<m>-<n> | Card | |
| WQPT | SLOT-<m>-<n>-<s> | SFP | <s> = 1 . . . 8 |

| Facility AIDs | Generic Facility AID: <prefix>-<shelfID#>-<slot#>-<port#>-<facility#> | | |
|---|---|---|---|
| MOD2 | AID | Facility Type | PIU-1 Specific |
| GETH | PC-<m>-<n>-<p> | Physical Client | <p> = 1 . . . 6 |
| GETH | LA-<m>-<n>-<p> | Logical Access | <p> = 1 . . . 4 |

TABLE 2-continued

| | | | |
|---|---|---|---|
| GETH | LC-<m>-<n>-<p>-<k> | Logical Client (Sub) | <p> = 1 . . . 4, <k> = 1 . . . 2 |
| ODU1 | LC-<m>-<n>-<p> | Logical Client | <p> = 1 . . . 4 |
| OTU2 | LN-<m>-<n>-<p> | Logical Network | <p> = 1 |
| OCH | PN-<m>-<n>-<p> | Physical Network | <p> = 1 |

Key
<m> = <shelfID#>
<n> = <slot#>
<s> = <sub-slot#>
<p> = <port#> or <facility#>
<k> = <facility#> or <sub-facility#>

The AIDs assigned to the equipment, e.g., shelf, slot, and/or sub-slot, may comprise the combination of prefixes and fields, including "SHELF-<m>" for the PIU's shelf, "SLOT-<m>-<n>" for the PIU card, and "SLOT-<m>-<n>-<s>" for each SFP 304. The <MOD2> in TL1 commands, which may be used to provision each of the equipment, may be "EQPT" for the shelf and the card, and WQPT for each SFP 304. Specifically, there may be about eight SFPs 304 that may be assigned the integer s from about one to about eight.

The AIDs assigned to the facilities may comprise the combination of prefixes and fields, including "PC-<m>-<n>-<p>" for the facilities corresponding to the first end ports 302, "LA-<m>-<n>-<p>" for the facilities corresponding to the intermediate ports 306, and "LC-<m>-<n>-<p>-<k>" for the sub-facilities 307. Additionally, the AIDs may comprise "LC-<m>-<n>-<p>" for the facilities corresponding to the first aggregate ports 308, "LN-<m>-<n>-<p>" for the facility (or sub-facilities) corresponding to the second aggregate port 309, and "PN-<m>-<n>-<p>" for the facility (or sub-facilities) corresponding to the second end port 310. The <MOD2> in TL1 command, may be "GETH" for the facilities corresponding to the first end ports 302, the intermediate ports 306, and the sub-facilities 307. The <MOD2> may be "ODU1" for the sub-facilities corresponding to the first aggregate ports 308, "OTU2" for the facility corresponding to the second aggregate port 309, and "OCH" for the facility (or sub-facilities) corresponding to the second end port 310.

There may be about six facilities corresponding to the first end ports 302, which may be assigned the integer p from about one to about six. There may be about four facilities corresponding to the intermediate ports 306, which may be assigned the integer p from about one to about four. There may be about two sub-facilities 307 for each one of about four supporting ports. Each two sub-facilities 307 may be assigned the integer k from about one to about two. Additionally, there may be about four facilities corresponding to the first aggregate ports 308, which may be assigned the integer p from about one to about four. There may also be about one facility corresponding to the second aggregate port 309, and similarly for the second end port 310, which may be assigned the integer p equal to about one.

Figure 4:
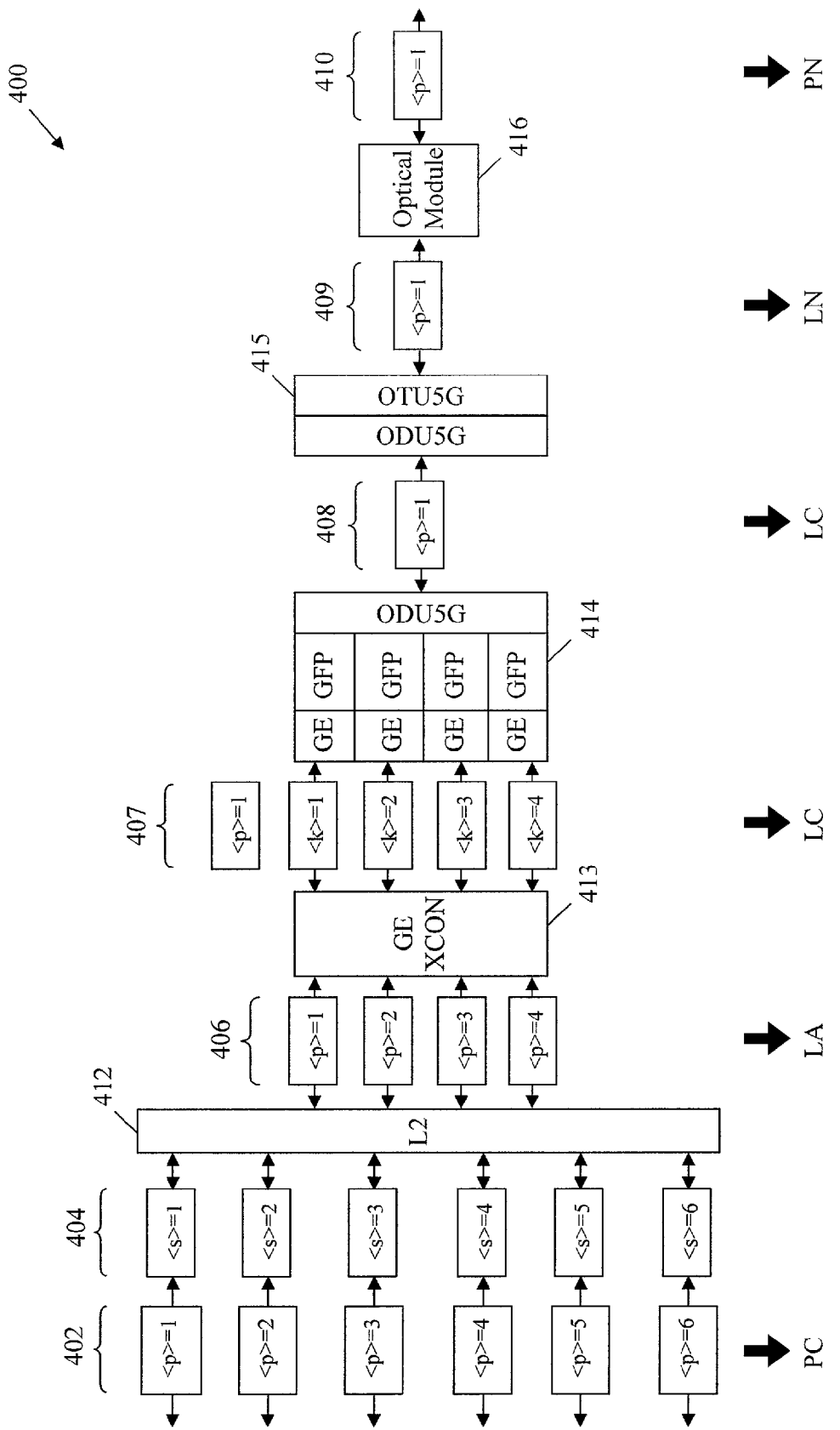
FIG. 4 is a schematic diagram of another embodiment of the connected entities model.

FIG. 4 illustrates another embodiment of a connected entities model 400, for example in a PIU-2 model. The entities may comprise a plurality of first end ports 402 and corresponding SFPs 404, a plurality of intermediate ports 406 and sub-facilities 407, a first aggregate ports 408 and second aggregate port 409, and a second end port 410. Additionally, the entities may comprise a L2 switch 412 and a GE XCON 413. The entities may also comprise a first ODU 414 that may comprise a GE GFP ODU5G module, a second ODU 415 that may comprise an ODU5G/OTU5G converter, and an optical module 416 positioned between the second aggregate port 409 and the second end port 410. The components of the connected entities model 400 may be configured similar to the corresponding components of the connected entities model 300.

Table 3 shows an embodiment of an AID table that may be used to associate the AIDs with the entities in the connected entities model 400. In the Table 3, the prefixes assigned to the ports/facilities in the PIU-2 model may comprise the prefix "PC" that corresponds to the first end ports 402, "LA" that corresponds to the intermediate ports 406, and "LC" that corresponds to the sub-facilities 407 and the first aggregate port 408. Additionally, the prefixes may comprise "LN" that corresponds to the second aggregate port 409, and "PN" that corresponds to the second end port 410. Specifically, there may be about six first end ports 402, which may be assigned the integer p from about one to about six. There may be about four intermediate ports 406, which may be assigned the integer p from about one to about four. There may be about one port supporting the sub-facilities 407, which may be assigned an integer p equal to about one. The second aggregate port 409, and similarly the second end port 410, may also be assigned an integer p equal to about one.

TABLE 3

| Prefix | Port/Facility Description | PIU-2 Specific |
|---|---|---|
| PC | Physical Client Port | p = 1 . . . 6 |
| LA | Logical Access Port | p = 1 . . . 4 |
| LC | Logical Client Port | p = 1 |
| LC | Logical Client Port | p = 1 |
| LN | Logical Network Port | p = 1 |
| PN | Physical Network Port | p = 1 |

| Equipment AIDs | Generic Equipment AID: SHELF/SLOT -<shelfID#>[-<slot#>[-<sub-slot#>]] | | |
|---|---|---|---|
| MOD2 | AID | Equipment Type | PIU-2 Specific |
| EQPT | SHELF-<m> | Shelf | |
| EQPT | SLOT-<m>-<n> | Card | |
| WQPT | SLOT-<m>-<n>-<s> | SFP | <s> = 1 . . . 6 |

TABLE 3-continued

| Facility AIDs | Generic Facility AID: <prefix>-<shelfID#>-<slot#>-<port#>-<facility#> | | |
|---|---|---|---|
| MOD2 | AID | Facility Type | PIU-2 Specific |
| GETH | PC-<m>-<n>-<p> | Physical Client | <p> = 1 ... 6 |
| GETH | LA-<m>-<n>-<p> | Logical Access | <p> = 1 ... 4 |
| GETH | LC-<m>-<n>-<p>-<k> | Logical Client (Sub) | <p> = 1, <k> = 1 ... 4 |
| ODU5G | LC-<m>-<n>-<p> | Logical Client | <p> = 1 |
| OTU5G | LN-<m>-<n>-<p> | Logical Network | <p> = 1 |
| OCH | PN-<m>-<n>-<p> | Physical Network | <p> = 1 |

Key
<m> = <shelfID#>
<n> = <slot#>
<s> = <sub-slot#>
<p> = <port#>
<k> = <facility#>

The AIDs assigned to the equipment may comprise the combination of prefixes and fields, including "SHELF-<m>" for the PIU-2 shelf, "SLOT-<m>-<n>" for the PIU-2 card, and "SLOT-<m>-<n>-<s>" for each SFP 404. The <MOD2>, which may be used to provision each of the equipment, may be "EQPT" for the shelf, the card, and the each SFP 404. Specifically, there may be about six SFPs 404 that may be assigned the integer s from about one to about six.

The AIDs assigned to the facilities may comprise the combination of prefixes and fields, including "PC-<m>-<n>-<p>" for the facilities corresponding to the first end ports 402, "LA-<m>-<n>-<p>" for the facilities corresponding to the intermediate ports 406, and "LC-<m>-<n>-<p>-<k>" for the sub-facilities 407. Additionally, the AIDs may comprise "LC-<m>-<n>-<p>" for the facility (or sub-facilities) that corresponds to the first aggregate port 408, "LN-<m>-<n>-<p>" for the facility (or sub-facilities) that corresponds to the second aggregate port 409, and "PN-<m>-<n>-<p>" for the facility (or sub-facilities) that corresponds to the second end port 410. The <MOD2> may be "GETH" for the facilities corresponding to the first end ports 402, the intermediate ports 406, and the sub-facilities 407. The <MOD2> may be "ODU5G" for the facility (or sub-facilities) that corresponds to the first aggregate port 408, "OTU5G" for the facility (or sub-facilities) corresponding to the second aggregate port 409, and "OCH" for the facility (or sub-facilities) corresponding to the second end port 410.

Specifically, there may be about six facilities corresponding to the first end ports 402, which may be assigned the integer p from about one to about six. There may be about four facilities corresponding to the intermediate ports 406, which may be assigned the integer p from about one to about four. There may be about four sub-facilities 407 supported by about one port, which may be assigned the integer k from about one to about four. Additionally, there may be about one facility that may be assigned an integer p equal to about one for each of the first aggregate port 408, the second aggregate port 409, and the second end port 410.

Figure 5A:
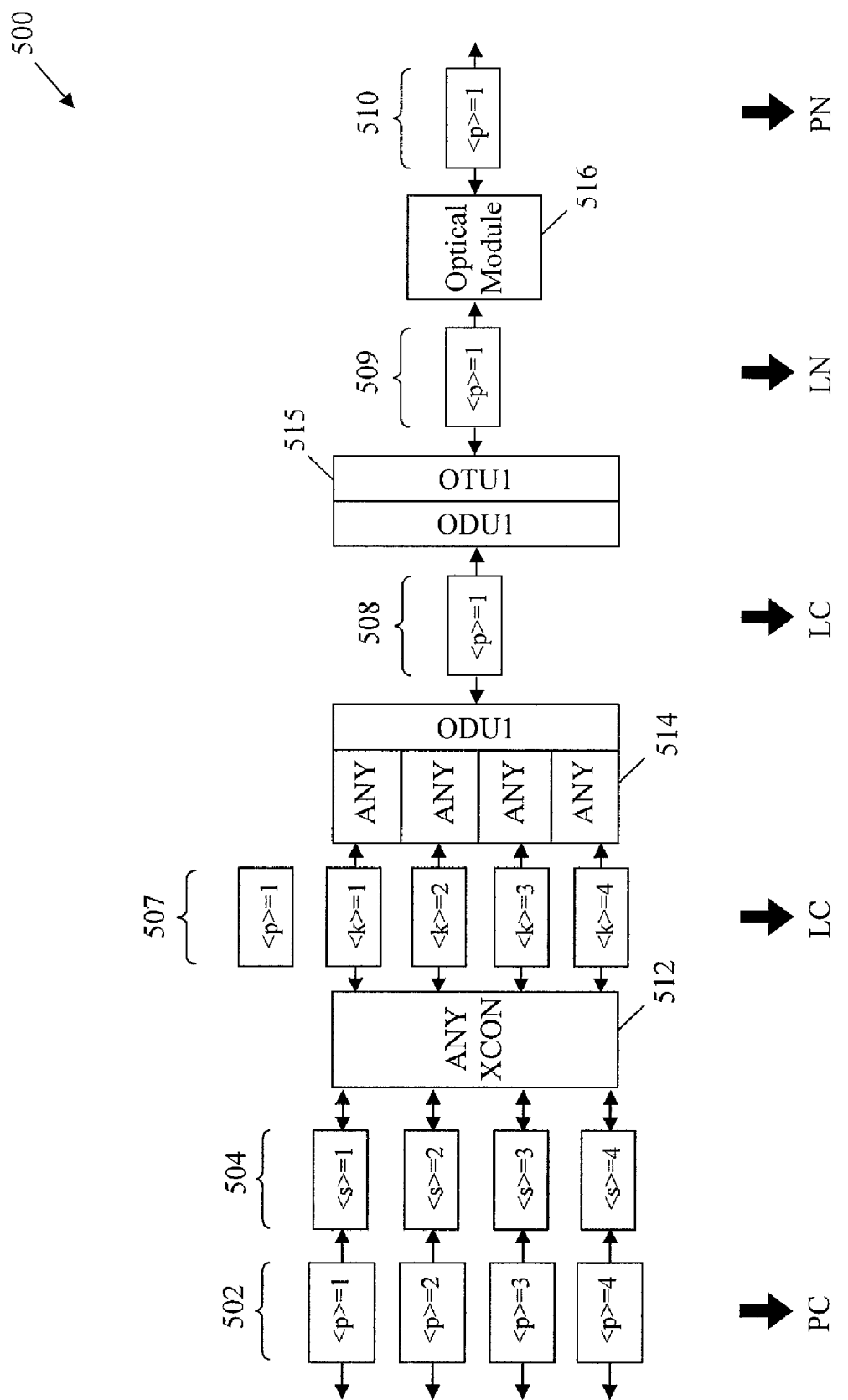
FIG. 5A is a schematic diagram of another embodiment of the connected entities model.

FIG. 5A illustrates another embodiment of a connected entities model 500, for example in a PIU-3 model developed by Huawei Technologies for a network equipment on a shelf. The entities may comprise a plurality of first end ports 502 and corresponding SFPs 504, a plurality of sub-facilities 507, a first aggregate port 508 and second aggregate port 509, and a second end port 510. Additionally, the entities may comprise any XCON 512, a first ODU 514 that may comprise an ODU1 module, a second ODU 515 that may comprise an ODU1/OTU1 converter, and an optical module 516. The components of the connected entities model 500 may be configured similar to the corresponding components of the connected entities model 300.

Table 4 shows an embodiment of an AID table that may be used to associate the AIDs with the entities in the connected entities model 500. In the Table 4, the prefixes assigned to the ports/facilities in the PIU-3 model may comprise the prefix "PC" that corresponds to the first end ports 502, "LC" that corresponds to the sub-facilities 507 (and similarly the first aggregate port 508), "LN" that corresponds to the second aggregate port 509, and "PN" that corresponds to the second end port 510. Specifically, there may be about four first end ports 502 that may be assigned the integer p from about one to about six. There may also be about one port supporting the sub-facilities 507, which may be assigned an integer p equal to about one. The second aggregate port 509, and similarly the second end port 510, may also be assigned an integer p equal to about one. The <MOD2> in TL1 commands that may be used to configure the equipment AIDs may be similar to Table 3.

In Table 4, the AIDs assigned to the equipment may be configured similar to Table 3. However, in Table 4, there may be about four SFPs 504 that may be assigned the integer s from about one to about four. The AIDs assigned to the facilities may also be configured similar to Table 3. However, the <MOD2> may be "ODU1" for the facility (or sub-facilities) that may correspond to the first aggregate port 508, and "OTU1" for the facility (or sub-facilities) corresponding to the second aggregate port 509. Further, there may be about four facilities corresponding to the first end ports 502.

TABLE 4

| Prefix | Port/Facility Description | PIU-3 Specific |
|---|---|---|
| PC | Physical Client Port | p = 1 ... 4 |
| LC | Logical Client Port | p = 1 |
| LN | Logical Network Port | p = 1 |
| PN | Physical Network Port | p = 1 |

TABLE 4-continued

| Equipment AIDs | Generic Equipment AID: SHELF/SLOT -<shelfID#>[-<slot#>[-<sub-slot#>]] | | |
|---|---|---|---|
| MOD2 | AID | Equipment Type | PIU-3 Specific |
| EQPT | SHELF-<m> | Shelf | |
| EQPT | SLOT-<m>-<n> | Card | |
| WQPT | SLOT-<m>-<n>-<s> | SFP | <s> = 1 . . . 4 |

| Facility AIDs | Generic Facility AID: <prefix>-<shelfID#>-<slot#>-<port#>-<facility#> | | |
|---|---|---|---|
| MOD2 | AID | Facility Type | PIU-3 Specific |
| ANY | PC-<m>-<n>-<p> | Physical Client | <p> = 1 . . . 4 |
| ANY | LC-<m>-<n>-<p>-<k> | Logical Client (Sub) | <p> = 1, <k> = 1 . . . 4 |
| ODU1 | LC-<m>-<n>-<p> | Logical Client | <p> = 1 |
| OTU1 | LN-<m>-<n>-<p> | Logical Network | <p> = 1 |
| OCH | PN-<m>-<n>-<p> | Physical Network | <p> = 1 |

Key
<m> = <shelfID#>
<n> = <slot#>
<s> = <sub-slot#>
<p> = <port#> or <facility#>
<k> = <1$^{st}$ level sub-facility#>
<l> = <2$^{nd}$ level sub-facility#>

Figure 5B:
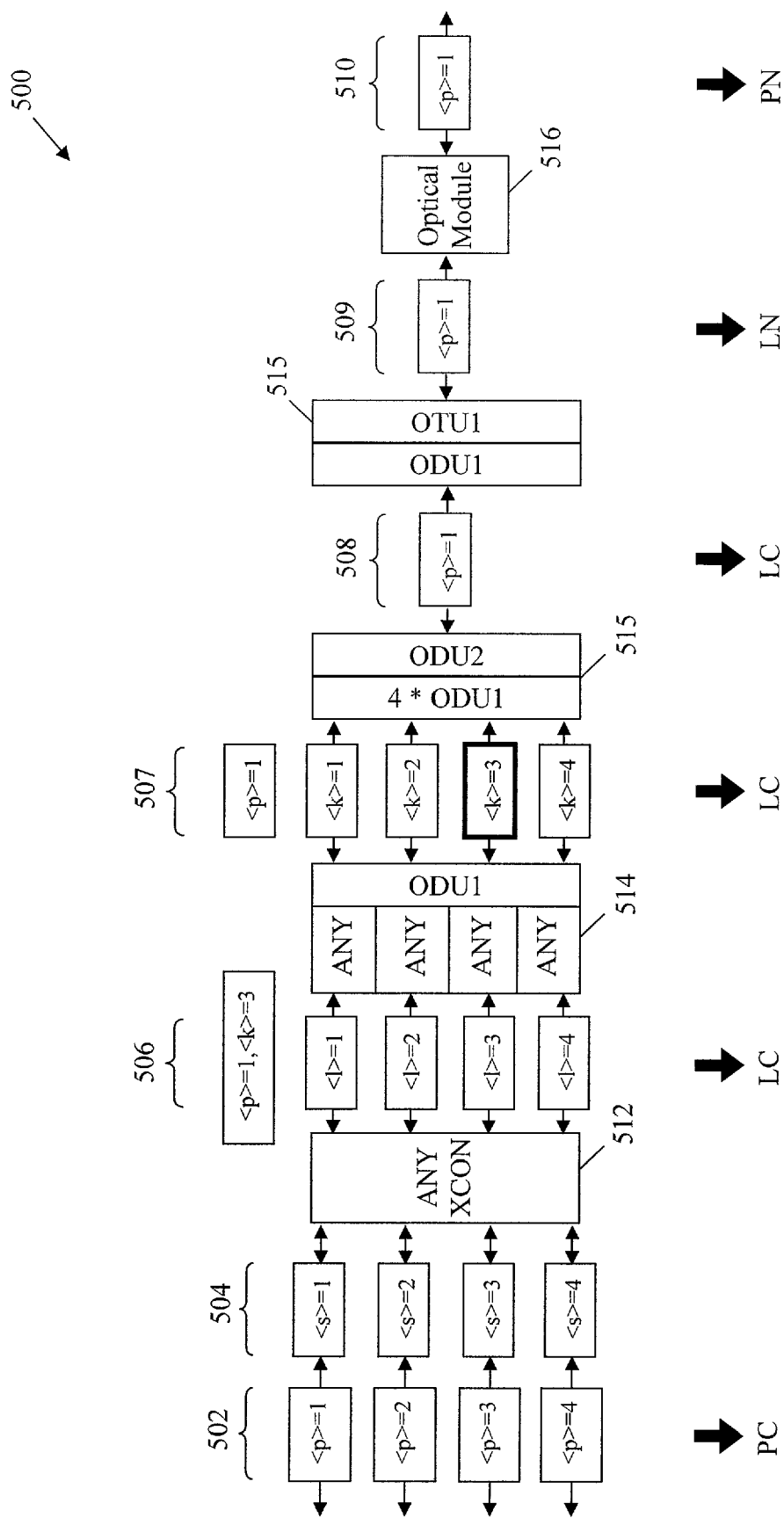
FIG. 5B is a schematic diagram of another embodiment of the connected entities model.

FIG. 5B illustrates another embodiment of the connected entities model 500. Specifically, the connected entities model 500 may comprise the entities in FIG. 5A. Additionally, in FIG. 5B, the entities may comprise a plurality of second level sub-facilities 506 and an ODU1/ODU2 converter 515. The ODU1/ODU2 converter 515 may comprise about four ODU1 modules and an ODU2 module and may be configured to multiplex client data between the ODU1 modules and the ODU2 module. The other entities in the connected entities model 500 may be configured similar to the corresponding components described above. However, the sub-facilities 507, which may be first level sub-facilities, may couple the first ODU 514 to the ODU1/ODU2 converter 515. At least one of the sub-facilities 507, such as the sub-facility assigned an integer k equal to about three, may be active and used to transfer frames between the first ODU 514 and the ODU1/ODU2 converter 515. Accordingly, the second level sub-facilities 506, which may couple the XCON 512 to the first ODU 514, may be associated with that active sub-facility 507. For instance, there may be about four second level sub-facilities 506, which may be assigned an integer l from about one to about four. The configuration in FIG. 5B may simplify provisioning the client or NE (e.g., card) using the XCON 512.

Figure 6:
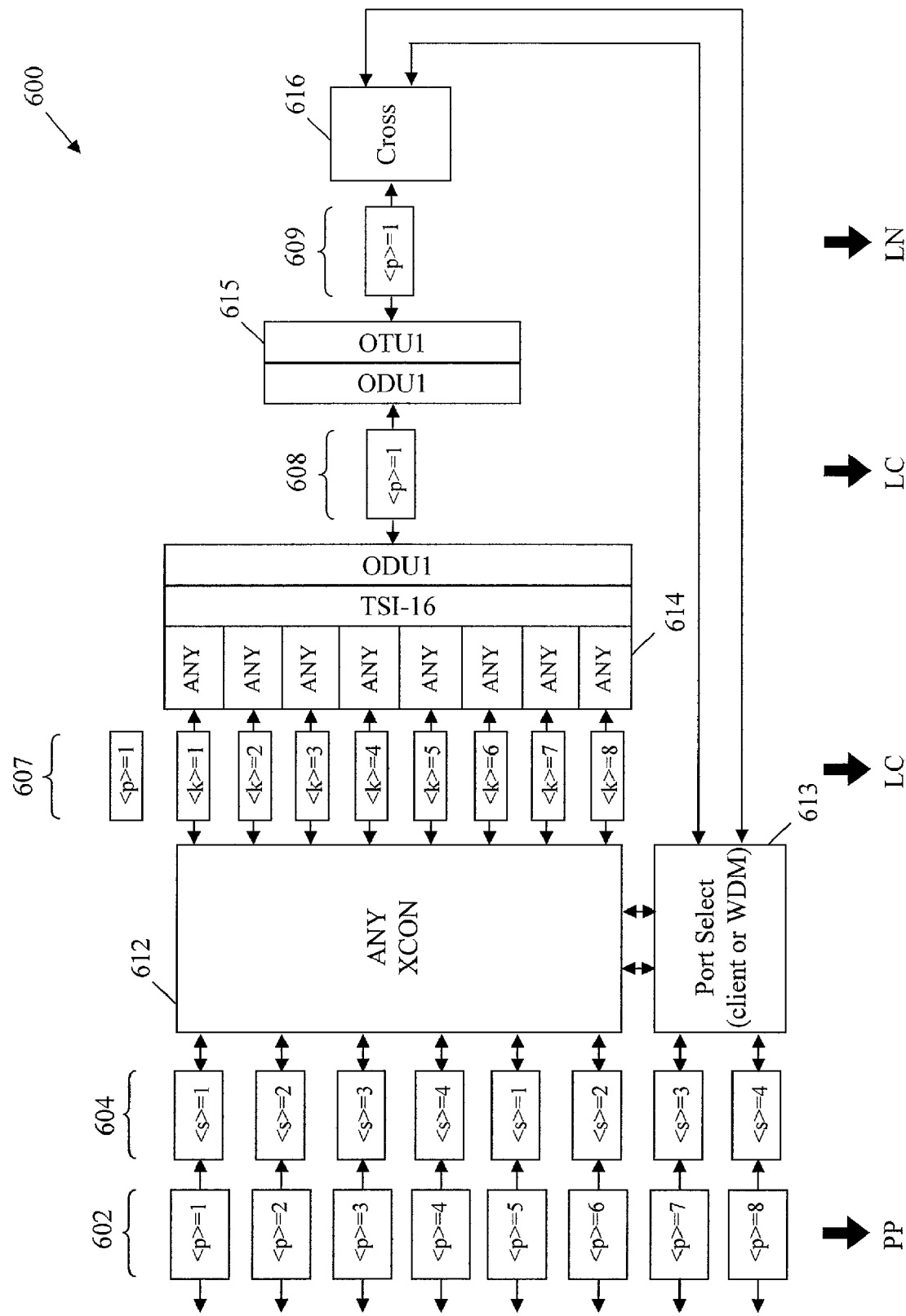
FIG. 6 is a schematic diagram of another embodiment of the connected entities model.

FIG. 6 illustrates another embodiment of a connected entities model 600, for example in a PIU-4 provisioning model. The entities may comprise a plurality of first end ports 602 and corresponding SFPs 604, a plurality of sub-facilities 607, a first aggregate port 608, and a second aggregate port 609. Additionally, the entities may comprise any XCON 612 coupled to a port selector 613 for client or WDM data, a first ODU 614 that may comprise a TSI-16/ODU1 module, a second ODU 615 that may comprise an ODU1/OTU1 converter, and a cross connector 616 that may be coupled to the port selector 613. The components of the connected entities model 600 may be configured similar to the corresponding components of the connected entities model 300. Further, the XCON 612, the port selector 613, and the cross connector 616 may exchange, combined, and/or rearrange frames between each other.

Table 5 shows an embodiment of an AID table that may be used to associate the AIDs with the entities in the connected entities model 600. In the Table 5, the prefixes assigned to the ports/facilities in the PIU-4 model may comprise the prefix "PP" that corresponds to the first end ports 602 and indicates a physical provisional port, "LC" that corresponds to the sub-facilities 607 (and similarly the first aggregate port 608), and "LN" that corresponds to the second aggregate port 609. Specifically, there may be about eight end ports 602 and about one port supporting the sub-facilities 607. The AIDs assigned to the facilities may comprise "PP-<m>-<n>-<p>" for the facilities corresponding to the first end ports 602, and "LC-<m>-<n>-<p>-<k>" for the sub-facilities 607. Additionally, the AIDs may comprise "LC-<m>-<n>-<p>" for the facility (or sub-facilities) that corresponds to the first aggregate port 608, "LN-<m>-<n>-<p>" for the facility (or sub-facilities) that corresponds to the second aggregate port 609, and "PP-<m>-<n>-<p>" for the facility (or sub-facilities) that may be established between the cross connector 616 and the port selector 613. The <MOD2> that may be used to configure the equipment and facility AIDs may be similar to Table 5.

Specifically, there may be about eight facilities corresponding to the first end ports 602, and there may be about eight sub-facilities 607 supported by about one port. There may also be about one facility for each of the first aggregate port 608 and second aggregate port 609. Additionally, there may be about eight facilities between the cross connector 616 and the port selector 613, which may be assigned the integer p from about one to about eight, or at the at least about two facilities (e.g., <p>=7 or 8). In addition, the PP prefix may indicate a physical provisionable port, e.g., a flexible port that can be provisioned for the client or WDM side. Finally, the OCH facility AID may be any of 1-8 and be on the WDM side.

TABLE 5

| Prefix | Port/Facility Description | PIU-4 Specific |
|---|---|---|
| PP | Physical Provisional Port | p = 1 ... 8 |
| LC | Logical Client Port | p = 1 |
| LN | Logical Network Port | p = 1 |

| Equipment AIDs | Generic Equipment AID: SHELF/SLOT -<shelfID#>[-<slot#>[-<sub-slot#>]] | | |
|---|---|---|---|
| MOD2 | AID | Equipment Type | PIU-4 Specific |
| EQPT | SHELF-<m> | Shelf | |
| EQPT | SLOT-<m>-<n> | Card | |
| WQPT | SLOT-<m>-<n>-<s> | SFP | <s> = 1 ... 8 |

| Facility AIDs | Generic Facility AID: <prefix>-<shelfID#>-<slot#>-<port#>-<facility#> | | |
|---|---|---|---|
| MOD2 | AID | Facility Type | PIU-4 Specific |
| ANY | PP-<m>-<n>-<p> | Provisional Client | <p> = 1 ... 8 |
| ANY | LC-<m>-<n>-<p>-<k> | Logical Client (Sub) | <p> = 1, <k> = 1 ... 8 |
| ODU1 | LC-<m>-<n>-<p> | Logical Client | <p> = 1 |
| OTU1 | LN-<m>-<n>-<p> | Logical Network | <p> = 1 |
| OCH | PP-<m>-<n>-<p> | Provisional Network | <p> = 7, 8 (or 1 ... 8) |

Key
<m> = <shelfID#>
<n> = <slot#>
<s> = <sub-slot#>
<p> = <port#> or <facility#>
<k> = <1st level sub-facility#>
<l> = <2nd level sub-facility#>

Figure 7:
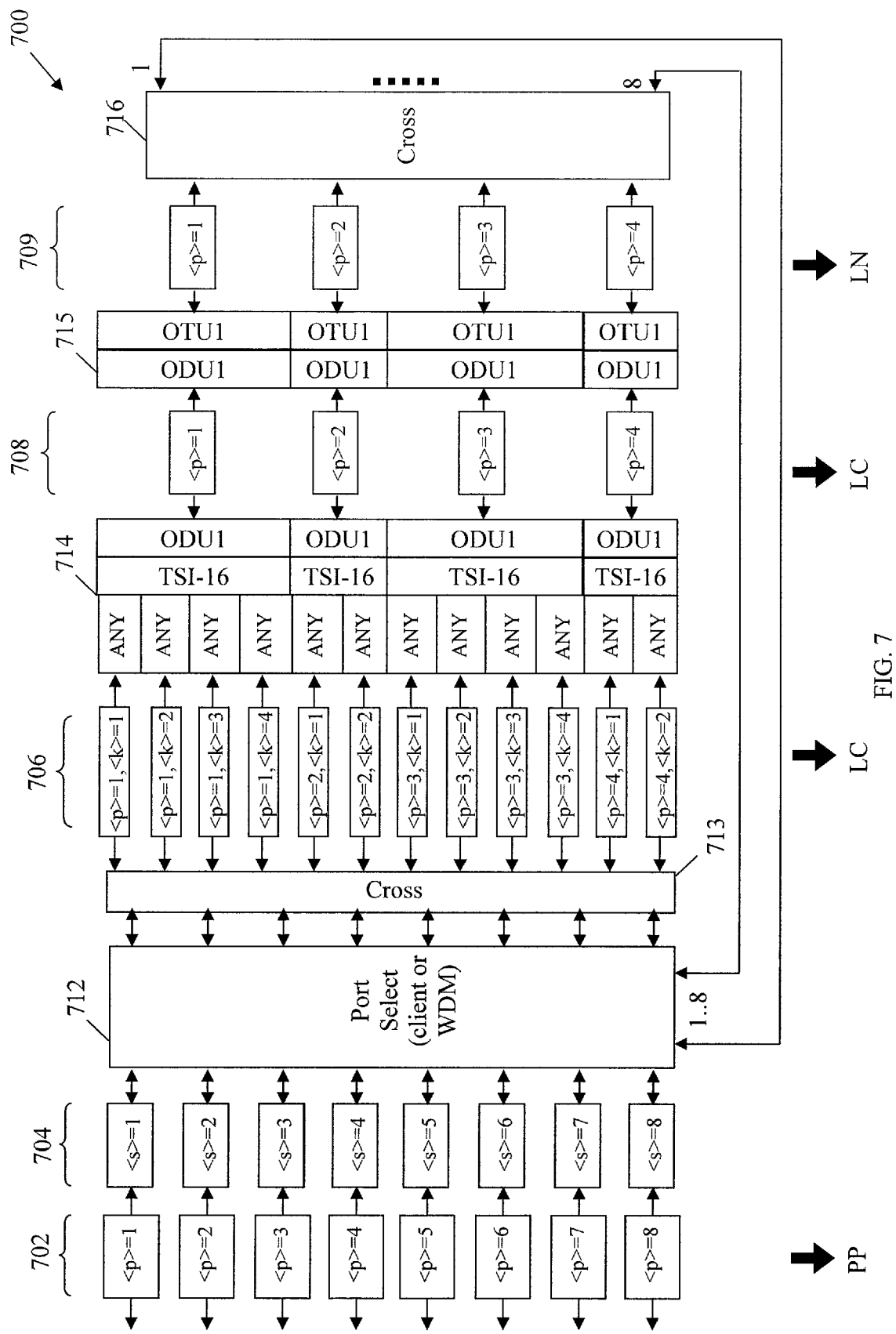
FIG. 7 is a schematic diagram of another embodiment of the connected entities model.

FIG. 7 illustrates another embodiment of a connected entities model 700, for example in a PIU-5 provisioning model. The entities may comprise a plurality of first end ports 702 and corresponding SFPs 704, a plurality of intermediate ports/facilities 706, a plurality of first aggregate ports 708, and a plurality of second aggregate ports 709. Additionally, the entities may comprise any a port selector 712 for client or WDM data coupled to a first cross connector 713, a first ODU 714 that may comprise a plurality of TSI-16/ODU1 modules, a second ODU 715 that may comprise a plurality of ODU1/OTU1 converters, and a second cross connector 716 that may be coupled to the port selector 712. The components of the connected entities model 700 may be configured similar to the corresponding components of the connected entities model 600. Table 6 shows an embodiment of an AID table that may be used to associate the AIDs with the entities in the connected entities model 700. In addition, the PP prefix may indicate a physical provisionable port, e.g., a flexible port that can be provisioned for the client or WDM side. Finally, the OCH facility AID may be any of 1-8 and be on the WDM side.

TABLE 6

| Prefix | Port/Facility Description | PIU-5 Specific |
|---|---|---|
| PP | Physical Provisional Port | P = 1 ... 8 |
| LC | Logical Client Port | P = 1 ... 4 |
| LN | Logical Network Port | P = 1 ... 4 |

| Equipment AIDs | Generic Equipment AID: SHELF/SLOT -<shelfID#>[-<slot#>[-<sub-slot#>]] | | |
|---|---|---|---|
| MOD2 | AID | Equipment Type | PIU-5 Specific |
| EQPT | SHELF-<m> | Shelf | |
| EQPT | SLOT-<m>-<n> | Card | |
| WQPT | SLOT-<m>-<n>-<s> | SFP | <s> = 1 ... 8 |

| Facility AIDs | Generic Facility AID: <prefix>-<shelfID#>-<slot#>-<port#>-<facility#> | | |
|---|---|---|---|
| MOD2 | AID | Facility Type | PIU-5 Specific |
| ANY | PP-<m>-<n>-<p> | Provisional Client | <p> = 1 ... 8 |
| ANY | LC-<m>-<n>-<p>-<k> | Logical Client (Sub) | <p> = 1 ... 4, <k> = 1 ... 4 |
| ODU1 | LC-<m>-<n>-<p> | Logical Client | <p> = 1 ... 4 |

TABLE 6-continued

| OTU1 | LN-\<m\>-\<n\>-\<p\> | Logical Network | \<p\> = 1 . . . 4 |
| OCH | PP-\<m\>-\<n\>-\<p\> | Provisional Network | \<p\> = 1 . . . 8 |

Key
\<m\> = \<shelfID#\>
\<n\> = \<slot#\>
\<s\> = \<sub-slot#\>
\<p\> = \<port#\> or \<facility#\>
\<k\> = \<1st level sub-facility#\>
\<l\> = \<2nd level sub-facility#\>

In the Table 6, the prefixes assigned to the ports/facilities in the PIU-5 model may be configured similar to Table 5. However, there may about four first aggregate ports 708 and about four second aggregate ports 709. The AIDs assigned to the facilities may also be configured similar to Table 5. However, and there may be about four ports and about four facilities (or sub-facilities) that may be combined, as shown in FIG. 7, to provide about eight intermediate ports/facilities 706. Further, there may be about four facilities (or sub-facilities) for each of the first aggregate ports 708 and second aggregate ports 709.

Figure 8:
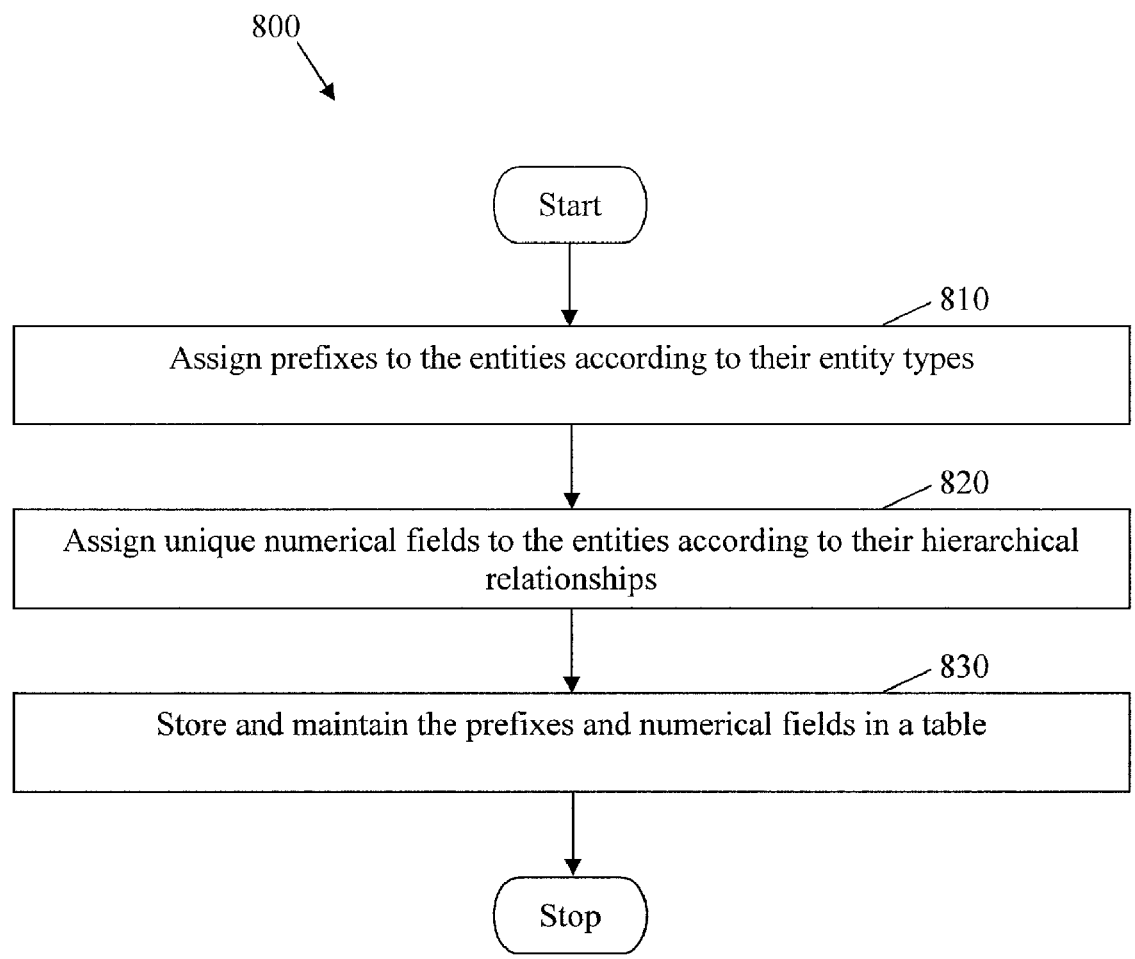
FIG. 8 is a flowchart of an embodiment of an AID provisioning method.

FIG. 8 is a flowchart of one embodiment of an AID provisioning method 800, which may simplify managing a plurality of connected entities, such as based on the models above. The method 800 may be used for assigning the equipment and facility AIDs for a plurality of network entities, for example in a NE on a shelf. The assigned AIDs may indicate the different types of the entities and the hierarchical relationship between the connected entities. The method 800 may begin at block 810, where the entities may be assigned prefixes according to their entity types. For example, each shelf, card or slot, sub-slot or SFP, port, facility and sub-facility, or combinations thereof may be assigned a corresponding appropriate prefix. Next, at block 820, the entities may be assigned unique numerical fields or strings according to their hierarchical relationships. The numerical field may comprise at least one integer that may distinguish each entity from any other entities. Additionally, the numerical field for each entity may comprise at least one or a plurality of integers that may indicate the hierarchical relationship between the entity and other connected entities. Next, at block 830, the method 800 the prefixes and numerical fields may be stored and maintained in a table or other data structure, for example in a database. The table may be then be configured by the network or an administration, for instance via a user interface, to manage the different entities.

Figure 9:
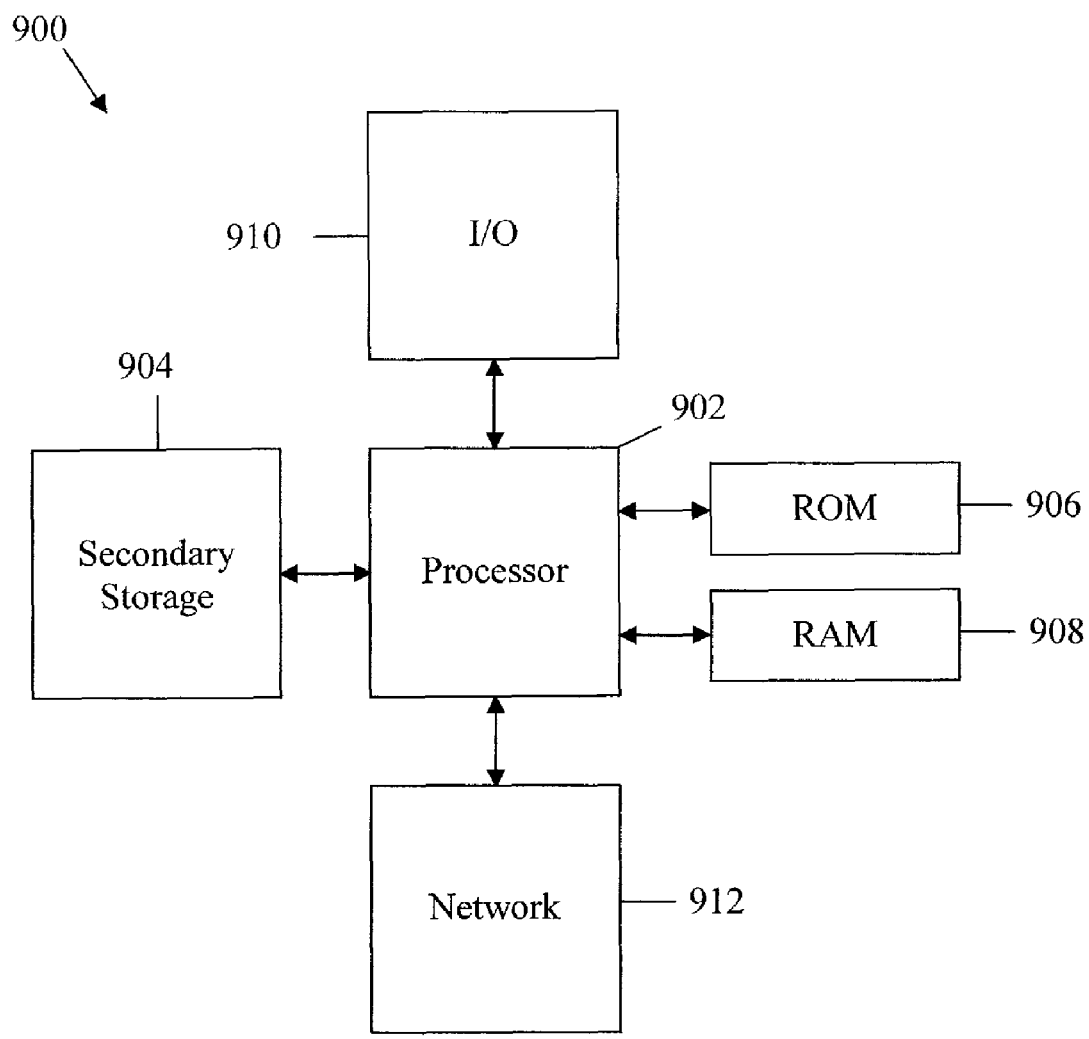
FIG. 9 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 9 illustrates a typical, general-purpose network component 900 suitable for implementing one or more embodiments of the components disclosed herein. The network component 900 includes a processor 902 (which may be referred to as a central processor unit or CPU) that is in communication with memory devices including secondary storage 904, read only memory (ROM) 906, random access memory (RAM) 908, input/output (PO) devices 910, and network connectivity devices 912. The processor 902 may be implemented as one or more CPU chips, or may be part of one or more application specific integrated circuits (ASICs).

The secondary storage 904 is typically comprised of one or more disk drives or tape drives and is used for non-volatile storage of data and as an overflow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a plurality of entities associated with a network element (NE), wherein the plurality of entities have a hierarchical relationship with one another,
wherein each of the plurality of entities is assigned one of a plurality of Access Identifiers (AIDs),
wherein each of the plurality of AIDs comprise one of a plurality of prefixes and a unique numerical field that specifies a corresponding NE entity's hierarchical ranking,
wherein each prefix indicates one of a plurality of entity types associated with a corresponding one of the plurality of entities,
wherein each prefix comprises a limited size string of characters,
wherein the AIDs are included in command messages and specify the entities during provisioning, monitoring, or cross-connecting functions,
wherein the plurality of entity types comprises a shelf, an equipment, a port, a facility, a sub-equipment, and a sub-facility, and
wherein the shelf is associated with the equipment, wherein the equipment is associated with the sub-equipment, the facility, the port, or combinations thereof, and wherein the facility is associated with the sub-facility.

2. The apparatus of claim 1, wherein the AID assigned to the shelf has a shorter numerical field than the AID assigned to the equipment, wherein the AID assigned to the equipment has a shorter numerical field than the AIDs assigned to the port and the facility, and wherein the AIDs assigned to the port and the facility have shorter numerical fields than the AID assigned to the sub-facility.

3. The apparatus of claim 2, wherein the AIDs assigned to the port and the facility have the same length numerical field.

4. The apparatus of claim 1, wherein the plurality of entities further comprise a second shelf, a second equipment, and a second facility,
wherein the AIDs assigned to the shelf and the second shelf have the same prefix,
wherein the AIDs assigned to the equipment and the second equipment have the same prefix, and
wherein the AIDs assigned to the facility and the second facility have the same prefix.

5. The apparatus of claim 1, wherein each prefix comprises at least one character and does not comprise any numbers.

6. The apparatus of claim 1, wherein each prefix is no more than about five characters in length.

7. The apparatus of claim 1, wherein each entity has a unique AID.

8. An apparatus comprising:
at least one processor configured to:
assign one of a plurality of Access Identifiers (AID) to each of a plurality of network element (NE) entities, wherein a first AID is assigned to a first NE entity,
wherein the plurality of NE entities have a hierarchical relationship such that the first NE entity has a first hierarchical ranking that is lower than, higher than, or equal to each of a plurality of hierarchical rankings associated with the other plurality of NE entities,
wherein each of the plurality of AIDs comprises one of a plurality of AID prefixes followed by an AID numerical field that specifies a corresponding NE entity's hierarchical ranking,
wherein each AID prefix comprises a limited size string of characters,
wherein the first AID comprises a first AID numerical field that is shorter than AID numerical fields specifying hierarchical rankings that are lower than the first hierarchical ranking, longer than AID numerical fields specifying hierarchical rankings that are higher than the first hierarchical ranking, and the same length as AID numerical fields specifying hierarchical rankings that are equal to the first hierarchical ranking,
wherein the plurality of NE entities comprises a shelf, an equipment, a port, a facility, a sub-equipment, and a sub-facility, and
wherein the shelf is associated with the equipment, wherein the equipment is associated with the sub-equipment, the facility, the port, or combinations thereof, and wherein the facility is associated with the sub-facility.

9. The apparatus of claim 8, wherein the processor is further configured to manage the plurality of NE entities by provisioning the plurality of NE entities, monitoring the plurality of NE entities, cross-connecting the plurality of NE entities, or combinations thereof.

10. The apparatus of claim 8, wherein the processor is further configured to manage the plurality of NE entities using a MOD2 of a command code in a Transaction Language 1 (TL1) in combination with the plurality of AIDs.

11. The apparatus of claim 10, wherein the plurality of AIDs and the MOD2 in the command code are maintained in a table.

12. The apparatus of claim 8, wherein the plurality of AID prefixes comprise a "PC" to indicate a physical client port, a "PN" to indicate a physical network port, an "LC" to indicate a logical client port, an "LA" to indicate a logical access port, an "LN" to indicate a logical network port, and a "PP" to indicate a provisional port.

13. The apparatus of claim 8, wherein the AID numerical fields comprise a first integer that enumerates a shelf, a second integer that enumerates an equipment, a third integer that enumerates a port and a corresponding facility, and a fourth integer that enumerates a sub-facility.

14. The apparatus of claim 8, wherein the NE entities are connected to a plug-in unit (PIU) based on a PIU-1, a PIU-2, a PIU-3, a PIU-4, or a PIU-5 model.

15. The apparatus of claim 8, wherein the NE entities are connected to a cross connect (XCON), an Optical Data Unit (ODU), an Optical Transport Unit (OTU), a Layer Two (L2) switch, a port selector for Wavelength Division Multiplexing (WDM) data, an optical module, or combinations thereof.

16. The apparatus of claim 1, wherein each numerical field indicates the hierarchical relationship between the corresponding one of the plurality of entities and the other plurality of entities.

17. The network of claim 8, wherein each AID numerical field consists essentially of a string of numbers, wherein each of the plurality of AID prefixes comprise no more than about five characters, and wherein each of the plurality of AID prefixes specifies one of a plurality of entity types associated with a corresponding one of the plurality of NE entities.

18. A method comprising:
assigning a unique Access Identifier (AID) to each of a plurality of network element (NE) entities, wherein a first AID is assigned to a first NE entity,
wherein the plurality of NE entities have a hierarchical relationship such that the first NE entity has a first hierarchical ranking that is lower than, higher than, or equal to each of a plurality of hierarchical rankings associated with the other plurality of NE entities,
wherein each of the plurality of AIDs comprises one of a plurality of AID prefixes followed by an AID numerical field that specifies a corresponding NE entity's hierarchical ranking,
wherein each AID prefix comprises a limited size string of characters,
wherein the first AID comprises a first AID numerical field that is shorter than AID numerical fields specifying hierarchical rankings that are lower than the first hierarchical ranking, longer than AID numerical fields specifying hierarchical rankings that are higher than the first hierarchical ranking, and the same length as AID numerical fields specifying hierarchical rankings that are equal to the first hierarchical ranking,
wherein the plurality of NE entities comprises a shelf, an equipment, a port, a facility, a sub-equipment, and a sub-facility, and
wherein the shelf is associated with the equipment, wherein the equipment is associated with the sub-equipment, the facility, the port, or combinations thereof, and wherein the facility is associated with the sub-facility.

\* \* \* \* \*